United States Patent
Mao et al.

(10) Patent No.: US 10,861,000 B2
(45) Date of Patent: Dec. 8, 2020

(54) METHOD, SYSTEM, AND APPARATUS FOR APPLICATION LOADING

(71) Applicant: Tencent Technology (Shenzhen) Company Limited, Shenzhen (CN)

(72) Inventors: Wei Mao, Shenzhen (CN); Yuewei Chen, Shenzhen (CN); Xing Liang, Shenzhen (CN); Bin Zhang, Shenzhen (CN); Qiang Lu, Shenzhen (CN); Deyuan Li, Shenzhen (CN); Zhonghua Lai, Shenzhen (CN); Zhenyu Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 338 days.

(21) Appl. No.: 15/976,656

(22) Filed: May 10, 2018

(65) Prior Publication Data

US 2018/0260804 A1    Sep. 13, 2018

Related U.S. Application Data

(63) Continuation of application No. 15/211,796, filed on Jul. 15, 2016, now Pat. No. 9,996,832, which is a
(Continued)

(30) Foreign Application Priority Data

May 30, 2014    (CN) .......................... 2014 1 0238444

(51) Int. Cl.
  *G06Q 30/06*    (2012.01)
  *G06Q 20/12*    (2012.01)
(Continued)

(52) U.S. Cl.
  CPC ....... *G06Q 20/322* (2013.01); *G06Q 20/0855* (2013.01); *G06Q 20/12* (2013.01)

(58) Field of Classification Search
  CPC .............................. G06Q 30/06; G06Q 20/12
(Continued)

(56) References Cited

U.S. PATENT DOCUMENTS

| 8,005,930 B2 | 8/2011 | Abeln et al. |
| 2008/0103923 A1* | 5/2008 | Rieck ................. G06Q 30/0635 |
| | | 705/26.41 |

(Continued)

FOREIGN PATENT DOCUMENTS

| CN | 102054252 A | 5/2011 |
| CN | 102411585 A | 4/2012 |

(Continued)

OTHER PUBLICATIONS

Tencent Technology, ISRWO, PCT/CN2015/071779, Apr. 28, 2015, 7 pgs.
(Continued)

*Primary Examiner* — Clifford B Madamba
(74) *Attorney, Agent, or Firm* — Morgan, Lewis & Bockius LLP

(57) ABSTRACT

Method and device for processing a payment are disclosed. The method is performed at a user device and includes: receiving a user instruction for starting a payment through a pre-set payment platform; selecting a respective loading process from a plurality of loading processes for invoking a payment application, wherein: the plurality of loading processes include: a first loading process for invoking the payment application immediately in a foreground process and a second loading process for simulating at least one payment interface of the payment application in the purchase application before loading the payment application in
(Continued)

the user device; and presenting a first payment interface at the mobile terminal in response to the user instruction and the selection of the respective loading process.

20 Claims, 10 Drawing Sheets

Related U.S. Application Data continuation of application No. PCT/CN2015/071779, filed on Jan. 28, 2015.

(51) Int. Cl.
*G06Q 20/32* (2012.01)
*G06Q 20/08* (2012.01)

(58) Field of Classification Search
USPC .......................................................... 705/41
See application file for complete search history.

(56) References Cited

U.S. PATENT DOCUMENTS

| | | |
|---|---|---|
| 2012/0078732 A1 | 3/2012 | Heller |
| 2013/0080420 A1 | 3/2013 | Taylor et al. |
| 2014/0351147 A1* | 11/2014 | Castrechini ............ G06Q 20/20 705/79 |

FOREIGN PATENT DOCUMENTS

| | | |
|---|---|---|
| CN | 102801710 A | 11/2012 |
| CN | 103365844 A | 10/2013 |
| CN | 103748593 A | 4/2014 |
| CN | 103782294 A | 5/2014 |
| WO | WO 2010144120 A2 | 12/2010 |

OTHER PUBLICATIONS

Tencent Technology, IPRP, PCT/CN2015/071779, Dec. 6, 2016, 5 pgs.

* cited by examiner

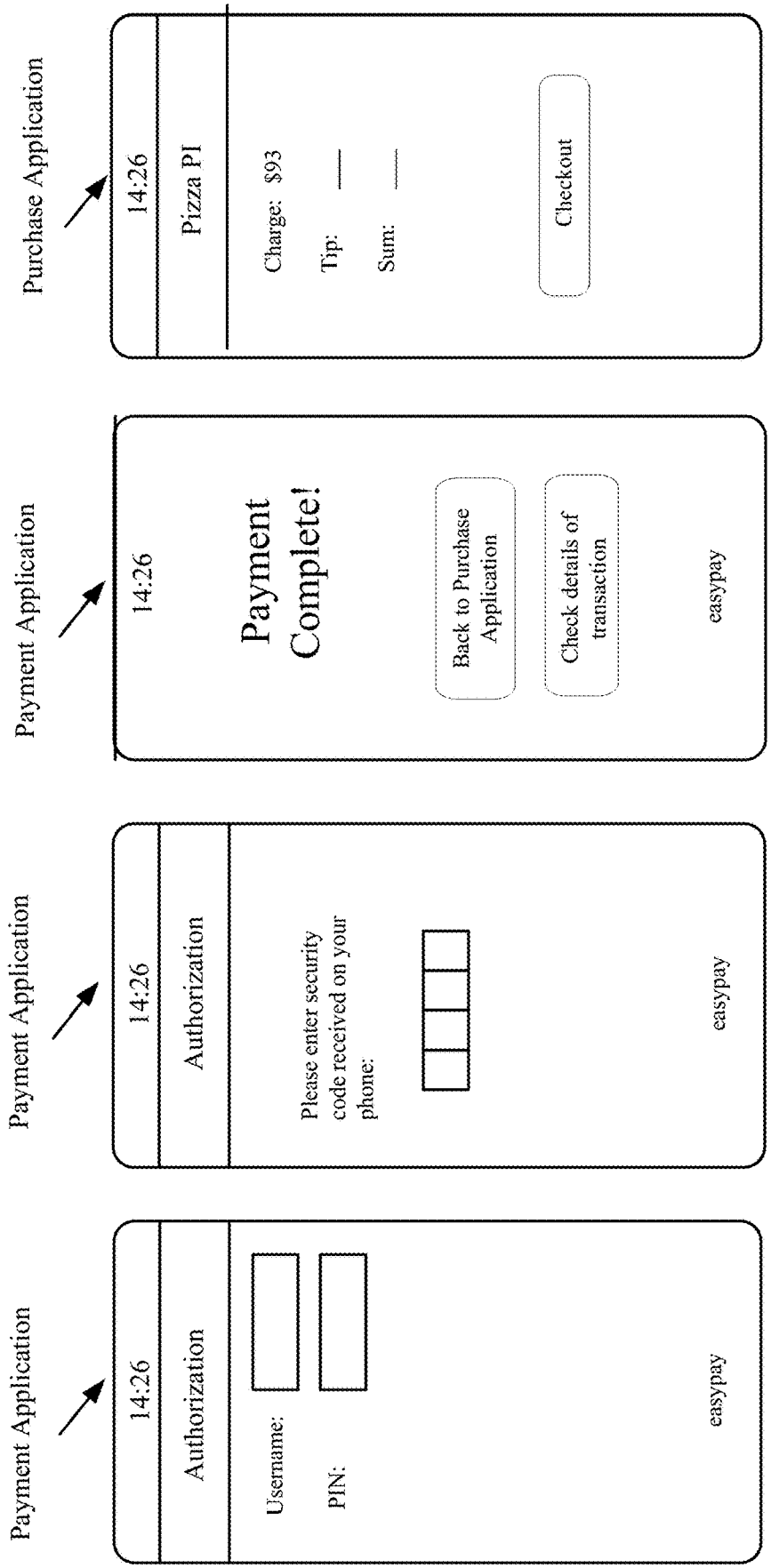

Server System 908

METHOD, SYSTEM, AND APPARATUS FOR APPLICATION LOADING

PRIORITY CLAIM AND RELATED APPLICATION

This application is a continuation application of U.S. patent application Ser. No. 15/211,796, entitled "METHOD, SYSTEM, AND APPARATUS FOR APPLICATION LOADING" filed on Jul. 15, 2016, which is a continuation application of PCT Patent Application No. PCT/CN2015/071779, entitled "METHOD, SYSTEM, AND APPARATUS FOR APPLICATION LOADING" filed on Jan. 28, 2015, which claims priority to Chinese Patent Application No. 201410238444.9, entitled "METHOD, SYSTEM, AND APPARATUS FOR INTERFACE LOADING" filed on May 30, 2014, all which are incorporated by reference in their entirety.

TECHNICAL FIELD

The present disclosure relates to the field of the Internet, and in particular, to a method for loading payment applications.

BACKGROUND

Online purchases and transactions are common nowadays. Usually, a user places an order or receives a bill from one software application and pays through another, dedicated payment application. It is inconvenient for the user as his computer has to load the payment application, which is time consuming and complicated in operation. When there is authentication required in the payment application, it becomes yet another hassle for the user. Therefore, it is desirable to provide users with an integrated solution for purchasing and payment, even when more than one application is used.

SUMMARY

In accordance with some implementations of the disclosed technology, a method of processing a payment is disclosed. The method is performed at a mobile terminal (e.g., client device 904, FIGS. 9 and 11). The method includes: receiving a user instruction for starting a payment through a pre-set payment platform through an entry interface of the purchase application; determining a type of connection through which the mobile terminal is currently connected to the Internet; selecting a respective loading process from a plurality of loading processes for invoking a payment application of the pre-set payment platform in accordance with the determined type of connection, further comprising: selecting a first loading process for invoking the payment application immediately in a foreground process when the mobile terminal is currently connected to the Internet through a public network and selecting a second loading process for simulating at least one payment interface of the payment application in the purchase application before loading the payment application in the mobile terminal when the mobile terminal is currently connected to the Internet through a password-protected private network; and presenting a first payment interface at the mobile terminal in response to the user instruction and the selection of the respective loading process, further comprising: loading the payment application into the respective loading process and utilizing increased encryption capabilities of the payment application to complete the payment in response to a selection of the first loading process; and simulating payment interfaces of the payment application in the purchase application without loading the payment application into the respective foreground process to complete the payment using the simulated payment interfaces of the payment application in the purchase application in response to a selection of the second loading process.

In another aspect, a mobile terminal (e.g., client device 904, FIGS. 9 and 11) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device (e.g., client device 904, FIGS. 9 and 11), cause the device to perform the method described above.

Although some aspects, functions, and processes are described from the perspective of the user device, the corresponding aspects, functions and processes performed at the server are apparent to persons skilled in the art in light of the descriptions provided herein. Other aspects and advantages are apparent in light of the descriptions provided below.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings.

FIGS. 8A-8G are user interfaces displayed in a user device in a payment process in accordance with some embodiments;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In accordance with some embodiments, the present disclosure provides an interface loading solution, that is, a solution of invoking a native exchange from a web page, so as to improve the loading speed of an interface.

To make the technical solutions of the present disclosure more clear and comprehensible, the solution of the present disclosure is further described in detail below with reference to the accompanying drawings and embodiments.

Figure 1:
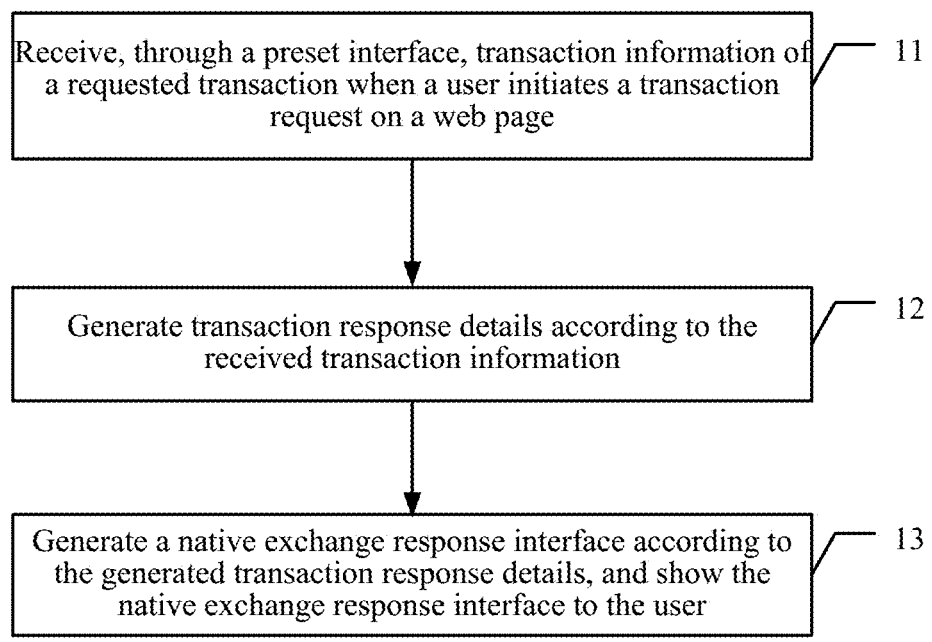
FIG. 1 is a flowchart of an interface loading method in accordance with some embodiments.

FIG. 1 is a flowchart of an interface loading method in accordance with some embodiments. As shown in FIG. 1, Step 11 to Step 13 in the following are included.

In accordance with some embodiments, in Step 11: receive, through a preset interface, transaction information of a requested transaction when a user initiates a transaction request on a web page.

When the user initiates a transaction request on the web page, the browser may acquire transaction information, and send the acquired transaction information to an application platform by invoking a preset interface of the application platform.

The preset interface may be a Java-script API interface, and the interface is a specific open interface of the application platform. Correspondingly, the browser may be in the application platform.

In accordance with some embodiments, in Step 12: Generate transaction response details according to the received transaction information.

Before this step is executed, the application platform performs security authentication on the received transaction information. For example, it is authenticated whether the provider of goods or service has registered with the application platform, and it is authenticated whether the resource is a legal resource that is legally permitted to be exchanged. And if the authentication succeeds, transaction response details are generated according to the received transaction information.

After the authentication succeeds, the application platform may generate the required transaction response details through interacting with a payment platform corresponding to the resource requested by the user.

That is, the application platform may acquire, in a get-package manner, information required for generating transaction response details corresponding to the transaction information from the payment platform corresponding to the resource, and subsequently, generate the transaction response details according to the acquired information required for generating transaction response details.

What is specifically included in the information required for generating transaction response details may be determined according to a practical requirement; for example, valid time, an exchange manner, and the like of the current exchange may be included.

In accordance with some embodiments, for each transaction, the application platform may acquire in advance a callback address, that is, a callback Uniform Resource Locator (URL), of the payment platform corresponding to the application platform, so as to acquire subsequently the information required for generating transaction response details according to the callback address. In some embodiments, the application platform may acquire, from the payment platform based on the callback address, the information required for generating transaction response details of the resource.

Specifically, in some embodiments, the application platform sends a request for acquiring the information required for generating transaction response details to the payment platform corresponding to the resource. In some embodiments, the request carries acquired transaction information, signature information of the application platform, and the like.

In accordance with some embodiments, the payment platform performs authentication on the received signature information, and if the authentication succeeds, returns to the application platform the information required for generating transaction response details corresponding to the transaction information, the signature information of the payment platform, and the like.

The application platform performs authentication on the received signature information of the payment platform, and if the authentication succeeds, generates transaction response details according to the received information required for generating transaction response details.

In accordance with some embodiments, in Step 13: Generate a native transaction response interface according to the generated transaction response details, and present the native transaction response interface to the user.

In some embodiments, in this step, the application platform further generates a native transaction response interface according to the transaction response details generated in Step 12, and presents the native transaction response interface to the user. In some embodiments, the native transaction response interface presents the transaction response details by using the native interface.

The specific manner of presenting transaction response details by using the native interface may be a window displaying transaction response details pops up. Alternatively, in some embodiments, an interface is pushed, for example, an interface displaying transaction response details is pushed from the right to the left.

In accordance with some embodiments, in Step 11, when the user initiates a request of purchasing an item on a web page, the browser sends item information to the application platform by invoking the JSAPI interface of the application platform. The item information may include seller information of the item and information of the item. The application platform may accomplish the purchase of the item in a native payment manner.

In accordance with some embodiments, the native payment is the redirection to the native interface of the application platform to present order information and other payment information, so as to implement faster and more efficient payment. In Step 12, the application platform may send the seller information, the information of the item, buyer information, together with the signature information, to the payment platform.

In addition, in some embodiments, the function of the application platform shown in FIG. 1 is accomplished by the client and the server in cooperation.

Figure 2:
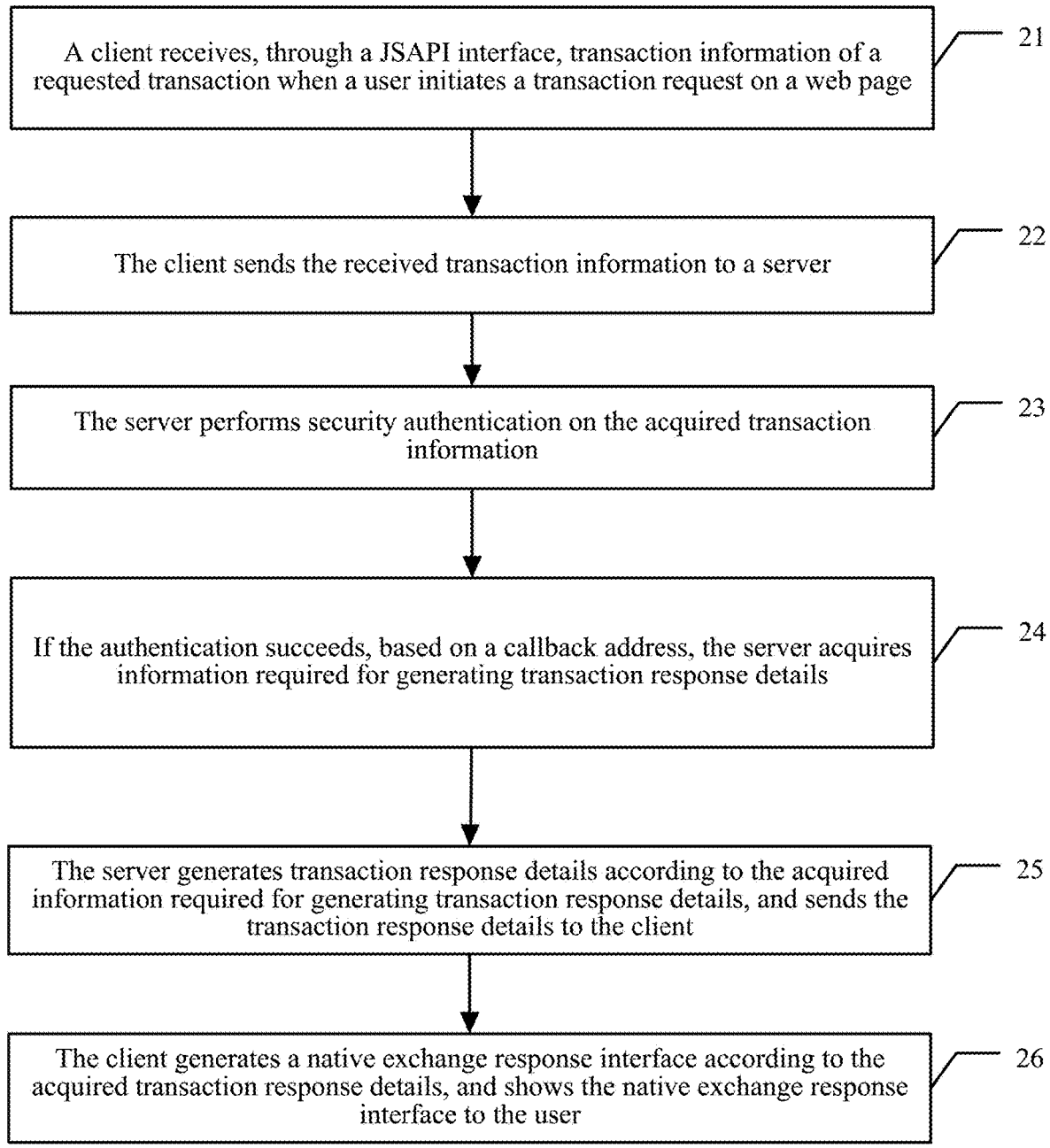
FIG. 2 is a flowchart of an interface loading method in accordance with some embodiments.

FIG. 2 is a flowchart of an interface loading method in accordance with some embodiments. As shown in FIG. 2, Step 21 to Step 26 in the following are included.

In accordance with some embodiments, in Step 21: A client receives, through a JSAPI interface, transaction information of a requested transaction when a user initiates a transaction request on a web page.

In accordance with some embodiments, in Step 22: The client sends the received transaction information to a server.

In accordance with some embodiments, in Step 23: The server performs security authentication on the acquired transaction information.

In accordance with some embodiments, in Step 24: If the authentication succeeds, based on a callback address, the server acquires, information required for generating transaction response details corresponding to the transaction information. In some embodiments, if the authentication fails, the process is ended.

In accordance with some embodiments, in Step 25: The server generates transaction response details according to the acquired information required for generating transaction response details, and sends the transaction response details to the client.

In accordance with some embodiments, in Step 26: The client generates a native transaction response interface according to the acquired transaction response details, and presents the native transaction response interface to the user.

In this method in accordance with some embodiments, when a user initiates a transaction request on a web page, transaction information requested by the user may be acquired through a preset interface. Subsequently, a native transaction response interface may be used to present transaction response details of a current exchange, eliminating the need of presenting a transaction response interface to the user through redirection of a web page, thereby improving a loading speed of a transaction response interface.

Moreover, the transaction, the JSAPI interface, and the native interface that are initiated on the web page are effectively combined, so that the native interface of the application platform can be open to the outside, thereby providing services to a third party.

Figure 3:
FIG. 3 is a schematic structural diagram of an interface loading system in accordance with some embodiments.

FIG. 3 is a schematic structural diagram of an interface loading system in accordance with some embodiments. As shown in FIG. 3, an application platform and a browser are included.

In accordance with some embodiments, when a transaction request initiated by a user on a web page is received, the browser is configured to acquire transaction information, and send the transaction information to the application platform by invoking a preset interface of the application platform.

In accordance with some embodiments, the application platform is configured to generate transaction response details according to the transaction information, generate a native transaction response interface according to the transaction response details, and present the native transaction response interface to the user.

In accordance with some embodiments, the application platform is configured to perform security authentication on the transaction information before the transaction response details are generated according to the transaction information, and if the authentication succeeds, generate transaction response details according to the transaction information.

Figure 4:
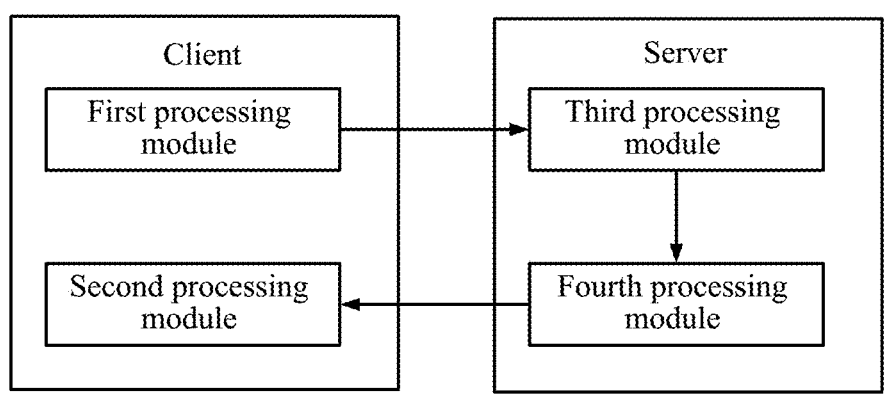
FIG. 4 is a schematic structural diagram of an application platform in accordance with some embodiments.

FIG. 4 is a schematic structural diagram of an application platform in accordance with some embodiments. As shown in FIG. 4, a client and a server are included.

In accordance with some embodiments, the client is configured to receive, transaction information of the requested transaction through a preset interface, and send the transaction information to the server; generate a native transaction response interface according to the transaction response details received from the server, and present the native transaction response interface to the user.

In accordance with some embodiments, the server is configured to generate transaction response details according to the transaction information, and send the transaction response details to the client.

In accordance with some embodiments, the server is configured to, perform security authentication on the transaction information, and if the authentication succeeds, generate the transaction response details according to the transaction information.

In accordance with some embodiments, the server is configured to acquire the information required for generating transaction response details corresponding to the transaction information, and generate transaction response details according to the acquired information required for generating transaction response details.

As shown in FIG. 4, in some embodiments, the client specifically includes: a first processing module and a second processing module.

In some embodiments, the first processing module is configured to receive transaction information of the requested transaction through a preset interface, and send the transaction information to the server.

In some embodiments, the second processing module is configured to generate a native transaction response interface according to the transaction response details received from the server, and present the native transaction response interface to the user.

As shown in FIG. 4, in some embodiments, the server specifically may include: a third processing module and a fourth processing module.

In some embodiments, the third processing module is configured to receive transaction information from the client and send the transaction information to the fourth processing module.

In some embodiments, the fourth processing module is configured to generate the transaction response details according to the received transaction information, and send the transaction response details to the client.

In some embodiments, the fourth processing module is configured to perform security authentication on the transaction information before the transaction response details are generated according to transaction information, and if the authentication succeeds, generate the transaction response details according to the transaction information.

In addition, the fourth processing module is configured to acquire the information required for generating transaction response details corresponding to the transaction information, and generate transaction response details according to the acquired information required for generating transaction response details.

Specifically, the fourth processing module sends a request for acquiring the information required for generating transaction response details to the payment platform, where the request carries the transaction information and the signature information of the fourth processing module; receives the information required for generating transaction response details corresponding to the transaction information and the signature information of the payment platform; and performs authentication on the received signature information of the payment platform, and if the authentication succeeds, generates transaction response details according to the received information required for generating transaction response details.

Figure 5:
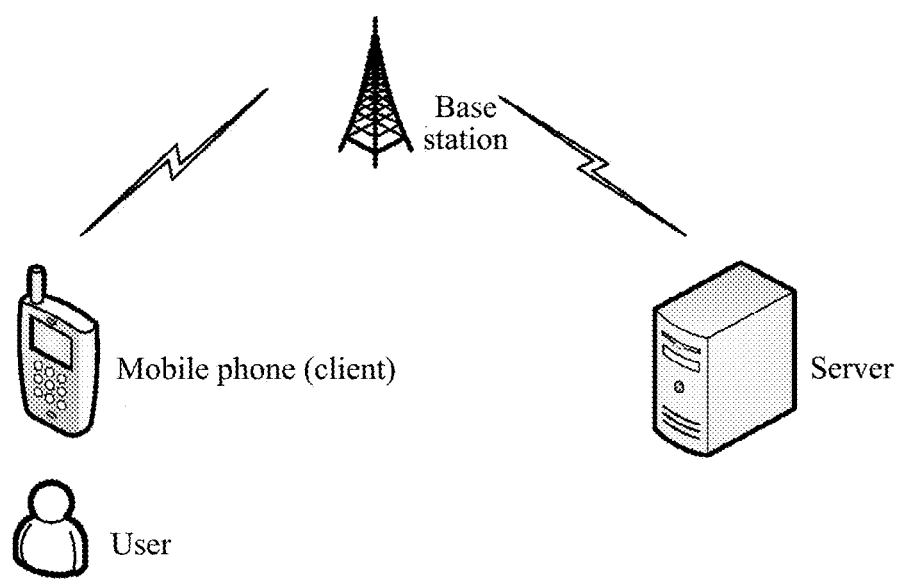
FIG. 5 is a schematic diagram of a hardware environment in which the application platform shown in FIG. 4 is implemented.

In accordance with some embodiments, the client shown in FIG. 4 may be an intelligent terminal, a personal computer, or the like. FIG. 5 is a schematic diagram of a hardware environment in which the embodiment of the application platform shown in FIG. 4 is implemented.

Figure 6:
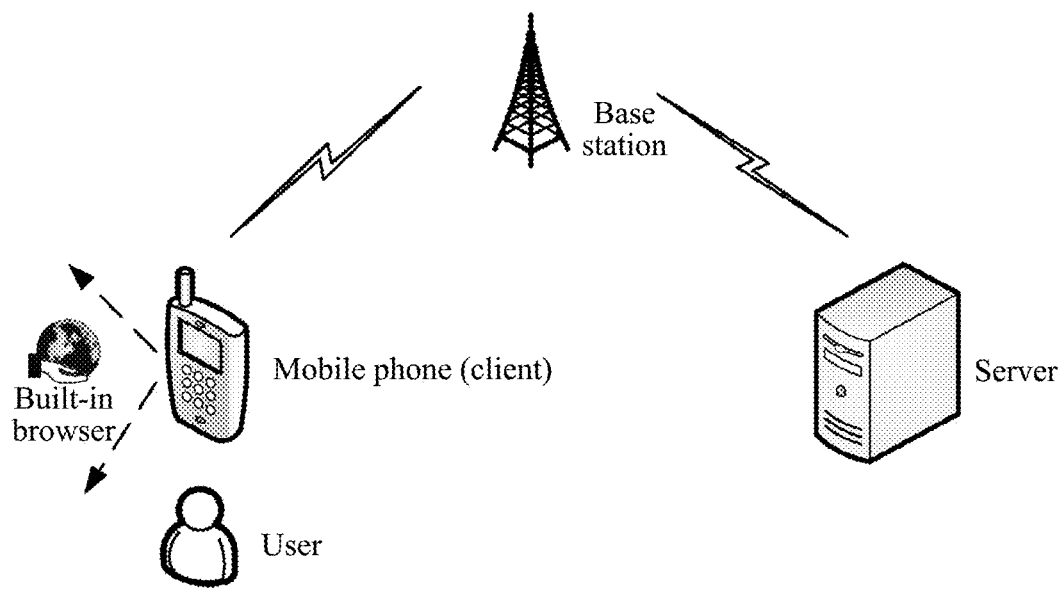
FIG. 6 is a schematic diagram of a hardware environment in which the system shown in FIG. 3 is implemented.

In accordance with some embodiments, FIG. 6 is a schematic diagram of a hardware environment in which the system shown in FIG. 3 is implemented. As discussed above, preferably, the browser is built in a mobile phone, and the user may initiate a transaction request on the web page by using the browser. Correspondingly, the browser sends the transaction information to the mobile phone, and then the current transaction is accomplished through information interaction between the mobile phone and a base station. As discussed above, the mobile phone may perform information interaction with the server by using the base station, and for specific interaction processes, reference may be made to corresponding descriptions in the foregoing embodiments of the method, and details are not elaborated herein.

Figure 7:
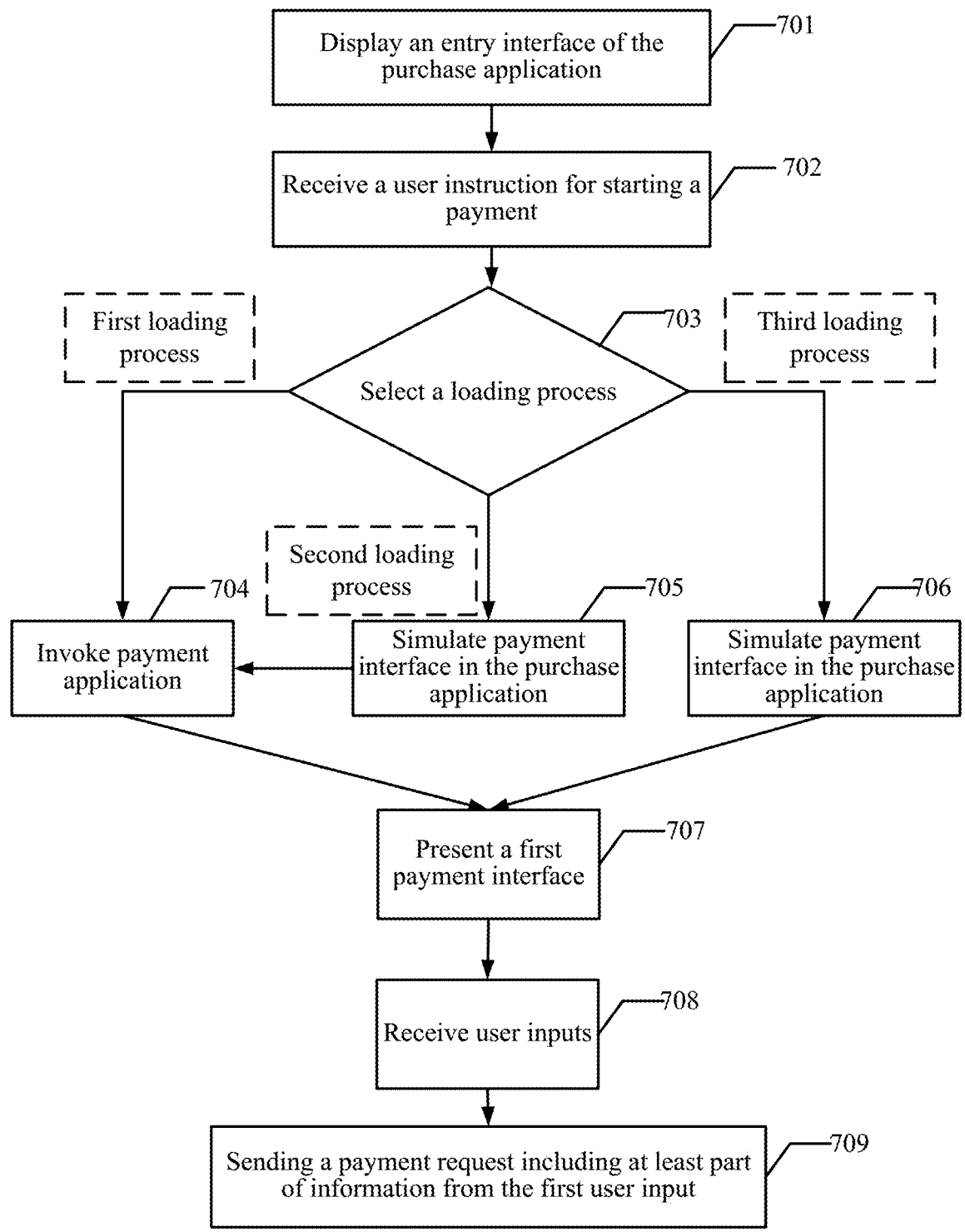
FIG. 7 is a flowchart of a method of processing a payment in accordance with some embodiments.

FIG. 7 is a flowchart of a method of processing a payment in accordance with some embodiments. In some embodiments, the method is performed at a user device having one or more processors and memory for storing one or more programs to be executed by the one or more processors. In some embodiments, the user device is connected with a server. In some embodiments, the user device is a computing device that can be a phone, a tablet, a desktop, a handheld computer, a laptop, and so on. FIGS. 8A-8G illustrate user interfaces displayed in a user device in a payment process in accordance with various scenarios and embodiments. The same user interfaces may appear in different stages of payments and in different payment processes.

In some embodiments, the user device is installed with a purchase application and a payment application. A purchase application can be any application that enables purchase behaviors of the users through the particular application. For example, a purchase application can be used for online shopping, restaurant ordering, calling taxi, hotel booking, online gaming, social network, as long as the purchase application enables some of the steps of a transaction. A payment application is used for complete a payment online for a transaction that is started by a purchase application. In some embodiments, the "purchase application" and the "payment application" can also be replaced by corresponding webpages served by different parties in a browser. The webpages from the different parties have different domain names. For example, a web browser can open one page as a purchase interface as a purchase application, and open another page as a payment interface as a payment application.

In accordance with some embodiments, in a step 701, the user device displays an entry interface of a purchase application. In some embodiments, an entry interface is used by a user to enter a payment process. In some embodiments, the entry interface is a purchase interface or a service interface that is configured to start a payment process. In some embodiments, the payment application is distinct from the purchase application. In some embodiments, the user device is installed with multiple purchase applications and payment applications.

In accordance with some embodiments, in a step 702, through an entry interface of a purchase application, the user device receives a user instruction for starting a payment through a pre-set payment platform.

In some embodiments, the user could use voice command or key combination to start the payment. For example, when the user device displays a payment interface, the user may press "enter" key to start the payment process. In accordance with some embodiments, in the entry interface of the purchase application, the user device displays an affordance for starting the payment through the pre-set payment platform. For example, the affordance could be the "checkout" button. In some embodiments, receiving the user instruction comprises detecting a selection of the affordance from the user.

Figures 8A, 8B, 8C:
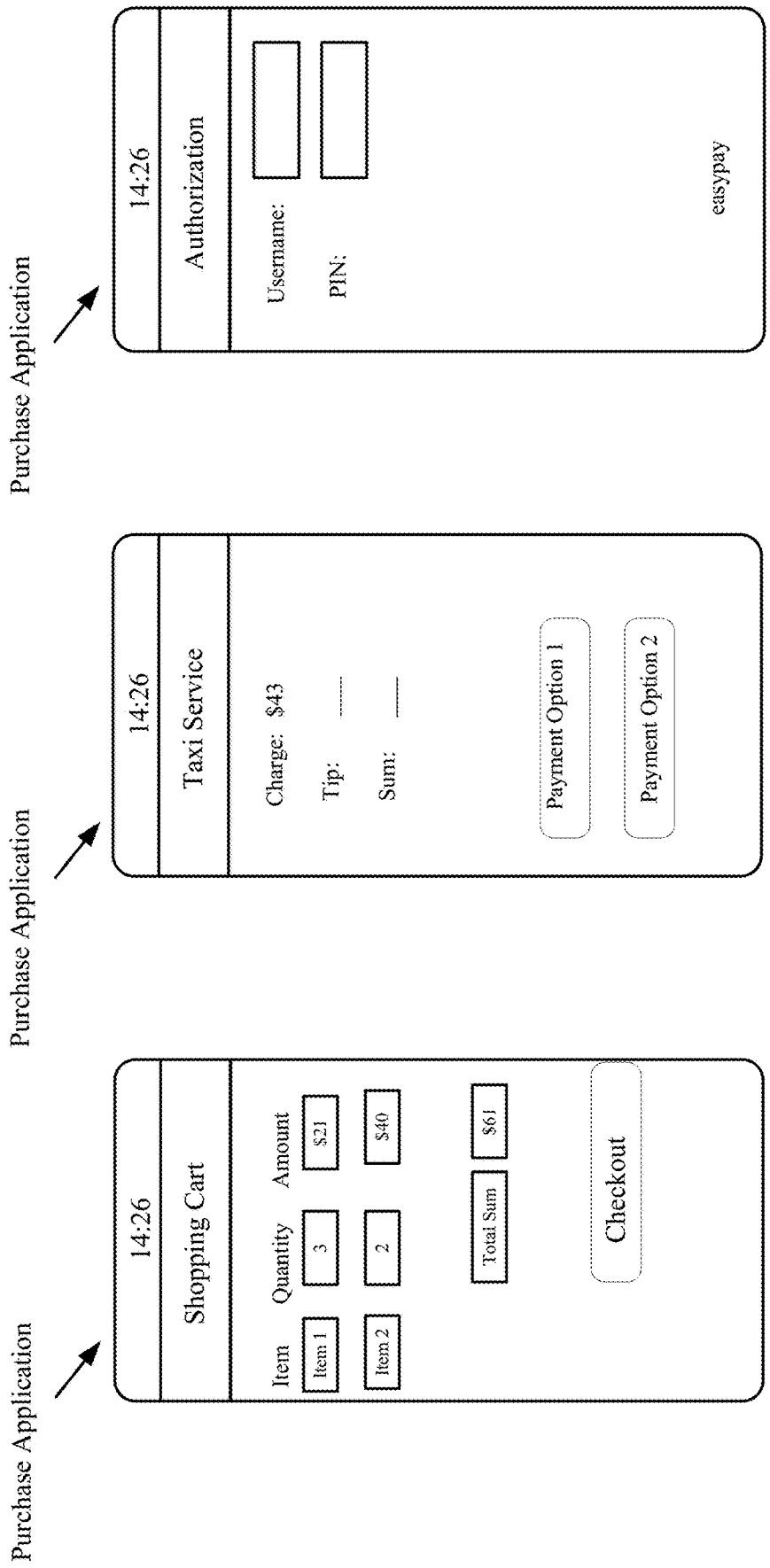

For example, FIG. 8A illustrates an entry interface that illustrates a shopping cart. When the user selects the "checkout" button, the user device will open a pre-set payment interface for the user to handle payment. FIG. 8B illustrates another entry interface, which is a service interface. In the service interface shown in FIG. 8B, once the user selects the payment option, the user device will open a payment interface corresponding to the payment option.

There are at least two scenarios in accordance with various embodiments. Firstly, the purchase application has a payment option which is bound with the pre-set payment platform. Once the user selects the pay button, the selection triggers a payment process using the pre-set payment platform. For example, FIG. 8A displays an entry interface, wherein if the "checkout" button is selected, the user device jumps to a payment interface of the pre-set payment platform. Secondly, the purchase application may include multiple payment options corresponding to different payment platforms, as shown in FIG. 8B. Option A and Option B represents different payment platforms. The selection of the pre-set payment platform is considered as receiving the user instruction for starting the payment using the pre-set payment platform.

In accordance with some embodiments, in a step 703, in accordance with predetermined criteria, the user device selects a respective loading process from a plurality of loading processes for invoking a payment application of the pre-set payment platform. In some embodiments, the plurality of loading processes including two or more of: (1) a first loading process for invoking the payment application immediately in a foreground process, (2) a second loading process for simulating at least one payment interface of the payment application in the purchase application before loading the payment application in the user device, and (3) a third loading process for completing the payment using simulated payment interfaces of the payment application without loading the payment application in the user device.

In some embodiments, the payment application integrates multiple authentication methods and security measures and can process payments more flexibly and/or more securely than the purchase application. However, invoking the payment application may be more time consuming and requires more processing resource from the user device. Therefore, in some embodiments, the predetermined criteria are set up to take account the smoothness of using purchase of application experienced by uses and additional safeguard and flexibility provided by the payment application.

In some embodiments, the predetermined criteria include that the payment environment is recognized as risky. For example, when the user device detects that the user device is connecting to the Internet through a public network and information sent through the public network has risk of being intercepted, the user device selects the first loading process to take advantage of the better encryption capability of the payment application. For another example, a laptop as the user device recognizes that the laptop is connecting through a safe office network, the laptop selects the third loading process so that the user has a better experience.

In some embodiments, the predetermined criteria include user's choice of authentication method. For example, the purchase application is only able to authenticate through either security questions or passwords. The user chooses an authentication method of fingerprint scanning, which can only be provided by the payment application. The user device then invokes the payment application by selecting either first or the second loading process.

In some embodiments, the predetermined criteria include whether the payment application has to be immediately invoked. For example, if the purchase application is able to provide the next payment interface, the user device selects the second loading process so that the payment interface of the purchase application is quickly displayed and the payment application is being loaded in the background when the user is viewing the payment interface of the purchase application.

In accordance with some embodiments, the predetermined criteria include user's choice. For example, the user device receives a user instruction to only use the purchase application in the payment process and the user device selects the third loading process. For another example, according to user setting, the user device uses the payment application only to process payment and the user device always selects the first loading process.

In accordance with some embodiments, the predetermined criteria include details of the payment. For example, the predetermined criteria may include that when the payment is the first time to pay the prospective payee, the first loading process is selected; otherwise, the third loading process is selected.

In accordance with some embodiments, the predetermined criteria include whether the user wants to use a function that only either purchase application or the payment application can provide. For example, when the user device receives a user instruction to leave a message to the payee, and the purchase application but not the payment application provides the function of leaving messages. Therefore, the user device selects the second or third loading process in accordance with the user instruction of leaving a message. For another example, the user wants to postpone a payment to 24 hours later and only the payment application but not the purchase application provides the function of postponing payment. Therefore, the user device selects the first or the second loading process.

In accordance with some embodiments, the first predetermined criteria include whether preset authentication is needed. Pre-set authentication can be additional safeguard designed for some, but not all, of the payments. A purchase can have one-click payment, password entering, voice recognition, fingerprint scanning, receiving and entering security code from another device, etc. The purchase application may not have the features to support all the pre-set authentication features, because it is simpler and safer to have one payment application that integrates multiple authentication methods. The pre-set authentication can be any authentication that is required to invoke the payment application. In accordance with some embodiments, selecting the loading process includes determining that pre-set authentication is required and in accordance with the determination that the pre-set authentication is required, determining to selecting the second loading process to invoke the payment application of the pre-set payment platform. Pre-set authentication is required when additional safe guard is needed, e.g., for a large amount of payment, risky payment environment (unfamiliar IP address or new device), and user choices.

In accordance with some embodiments, the predetermined criteria include a threshold payment amount. In some embodiments, the user device obtains an input specifying an amount of the payment. In some embodiments, the specified amount exceeds the threshold payment amount, and wherein in accordance with the obtained input specifying the amount of the payment, determining to select the first or second loading process to invoke the payment application of the pre-set payment platform. In some embodiments, the amount is automatically generated sometimes, e.g., by the goods purchased by the user. In some embodiments, the amount is received from user inputs. Then, in accordance with a determination to invoke the payment application through the second loading process, the user device displays an authentication interface of the payment application in accordance with some embodiments and receive a third user input of pre-set authentication information. In some embodiments, the third user input is sent to the pre-set payment platform by the payment application. For example, a user device has determined that additional pre-set authentication is required for processing a payment and selects a second loading process. The payment application is invoked and displays an authentication interface as illustrated in FIG. 8E. The third user input includes the security code received from a payment platform server.

In some embodiments, the predetermined criteria include the amount of payment. For example, the user may previously set a policy that if the payment amount is over $100, the user device invokes the payment application to process the payment. After the user selects "checkout" button in the interface as shown in FIG. 8A, the user device may select either the first or the second loading process since the total payment amount exceeds $100. Alternatively, the user may set a policy that a payment over $100 needs further authentication of security questions. If the authentication of security questions can only be provided by the payment application, the user device invokes the payment application.

In accordance with some embodiments, in the first loading process, the user device invokes payment application immediately in a foreground process. The first loading process includes a step 705, invoking the payment application, and a step 706, displaying a payment interface generated by the payment application in accordance with a selection of the first loading process. For example, as shown in FIG. 8D, in accordance with some embodiments, the user device displays a payment interface of a purchase application.

In accordance with some embodiments, the user device still uses the purchase application to receive at least part of the user inputs related to the payments. In this scenario, the user device selects the second or third loading process. In accordance with some embodiments, the second loading process includes a step 705, simulating at least one payment interface of the payment application in the purchase application, and a step 704, invoking the payment application in a foreground process. Although the step 704 appears in both the first and second loading process, the step 704 has a difference preceding step. In the first loading process, the user device invokes the payment application to handle the entire payment process immediately after the payment process begins. In the second loading process, the user device displays at least one payment interface of the purchase application and then makes a transition into the payment application.

In accordance with some embodiments, selecting the respective loading process includes that in accordance with a decision to not select the first loading process to load the payment application immediately in the foreground process, the user device displays a simulated payment interface generated by the purchase application. In accordance with some embodiments, the user device only determines that one of the second and the third loading process will be selected and makes the final selection of the loading process after receiving the user input into the payment interface of the purchase application. The user device receives a second user input for the payment through the simulated payment interface generated by the purchase application; and in accordance with the second user input for the payment, the user device determines whether to invoke the payment application. In some embodiments, the second user input for the payment includes payment amount, purchase item, shipping address, user selection of the payment application, or user selection of payment method.

In accordance with some embodiments, determining whether to invoke the payment application in accordance with the second user input further comprises: determining whether to invoke the payment application in a foreground process or a background process in accordance with the second user input. In some embodiments, during the second loading process, the payment application is loaded in a background process while the at least one simulated payment interface of the payment application is presented by the purchase application. For example, the payment interface of the purchase application is designed to receive or obtain an amount of payment. For example, FIG. 8G shows a payment interface of a purchase application in accordance with some embodiments. The predetermined criteria include that if the payment amount exceeds $100, the user device invokes the payment application. The user device determines that either the second or the third loading process is used and displays a payment interface of the purchase application to receive the second user input. The purchase application first receives a user input of payment amount in its payment interface and determines whether the payment amount is more than $100. If the payment amount is more than $100, the user device selects the second loading process and goes to step 704 and invokes the payment application. Otherwise, the user device selects the third loading process and displays the next payment interface of the purchase application.

In accordance with some embodiments, in a step 707 the user device presents a first payment interface at the user device in response to the user instruction and the selection of the respective loading process. For example, the user device first receives user instruction to checkout in an entry interface as shown in FIG. 8A and then, in a first loading process, displays a first payment interface of a payment application as shown in FIG. 8D. For another example, in a second loading process, the user device first displays a payment interface of the purchase application as shown in FIG. 8C, and invokes the payment application in the background while the user enters the user name and PIN. After the user finishes entering the user name and the PIN, the user device presents the first payment interface of the payment application as shown in FIG. 8E. For yet another example, the user device first receives user instruction to checkout in an entry interface as shown in FIG. 8A and then, in a first loading process, displays a first payment interface of a payment application as shown in FIG. 8C.

In accordance with some embodiments, payment interfaces, including the first payment interface, are generated by the purchase application to simulate corresponding payment interfaces of the payment application in accordance with a selection of the second or third loading process. For example, the payment interface of the purchase application as shown in FIG. 8C is similar to the payment interface of the payment application as shown in FIG. 8D. In some embodiments, the design (look and feel) of the payment interface of the purchase application is similar to the design of the payment interface of the payment application. When the device makes the transition from the purchase application to the payment application in the second loading process, the user will have a smooth experience not being disturbed by radically different designs. In addition, when the third loading process is selected, the user will feel familiar with the design of the payment interface application of the purchase application.

In accordance with some embodiments, in accordance with the determination to invoke the payment application, the user device obtains a progress state of the payment after the user device selects the second loading process. The user device selects a respective user interface corresponding to the progress state of the payment as a current payment interface of the payment application and then displays the current payment interface of the payment application in place of the simulated payment interface generated by the purchase application. In some embodiments, obtaining the progress of the payment is equivalent of obtaining the content of the second payment interface because the content of the second payment interface is determined by the progress of the payment. For example, in a second loading process, a payment interface of the purchase application as shown in FIG. 8C is displayed first, and after receiving a second user input through the payment interface of the purchase application, the user device displays a first payment interface of the payment application, as shown in FIG. 8E, to receive additional authentication information. Before displaying the first payment interface of the payment application as shown in FIG. 8E, the user device obtains the stage of the payment process and determines that additional authentication is needed and the interface shown in FIG. 8E is the next step of the payment process.

In some embodiments, in the second loading process the transition can only happen on a particular stage of the payment, e.g., right after the amount of payment is obtained. In some embodiments, the payment application can be revoked in more than one stage of payment. For example, the user may be able to invoke the payment application any time in a payment process. For another example, the purchase application is designed to invoke the payment application either when the purchase is completed or when the password is about to be entered.

In some embodiments, the user device acquires an account identifier from the payment platform. The user device then displays the account identifier in the simulated payment interface generated by the purchase application. The account identifier can be a pre-agreed picture, text, number, or video. When a user sees the pre-agreed picture, he knows that the second payment interface is an authentic page that is authorized by the payment platform. For example, the user may select a Panda picture as an account identifier. If the purchase application is not authorized by the payment platform to process payment for it, the purchase application is not able to obtain the "Panda picture" to show the user. For another example, the user may choose text "easypay" as the account identifier, as shown in FIGS. 8C-8G. Therefore, using the account identifier protects the users from unauthorized applications getting sensitive payment authentication information of the users.

In accordance with some embodiments, in a step 708, the user device receives a first user input for the payment through the first payment interface. In some embodiments, the first user input for the payment can be payment information, such as a payee account, a payment amount, a planned time of payment, whether to receive receipt, or authentication information, such as the user name and password. The content of the first user input depends on the progress of the payment. When the first user input is used for authentication, the first user input may include password, answer to security questions, PIN, fingerprint scanning, voice command, security codes, and so on.

In accordance with some embodiments, in a step 709, the user device sends a payment request including at least part of information from the first user input for the payment to the pre-set payment platform. For example, the first user input includes a payment amount and a user name of payment account, which are included in the payment request. In some embodiments, the payment request is sent to the pre-set payment platform by the payment application, e.g., in the first loading process. In some embodiments, the payment request is sent to the pre-set payment platform by the purchase application, e.g., in the third loading process. In some embodiments, the payment request is sent from the purchase application to the payment application loaded in the background, and from the payment application loaded in the background to the pre-set payment platform, e.g., in the second loading process. In some embodiments, during the second loading process, the payment request is sent to the pre-set payment platform after the payment application is loaded into the foreground.

In accordance with some embodiments, after the payment request is sent to the pre-set payment platform, the user device displays a payment confirmation page, either in the payment application, e.g., as shown in FIG. 8F, when the first or the second loading process has been selected, or in the purchase application, when the third loading process has been selected.

Figure 9:
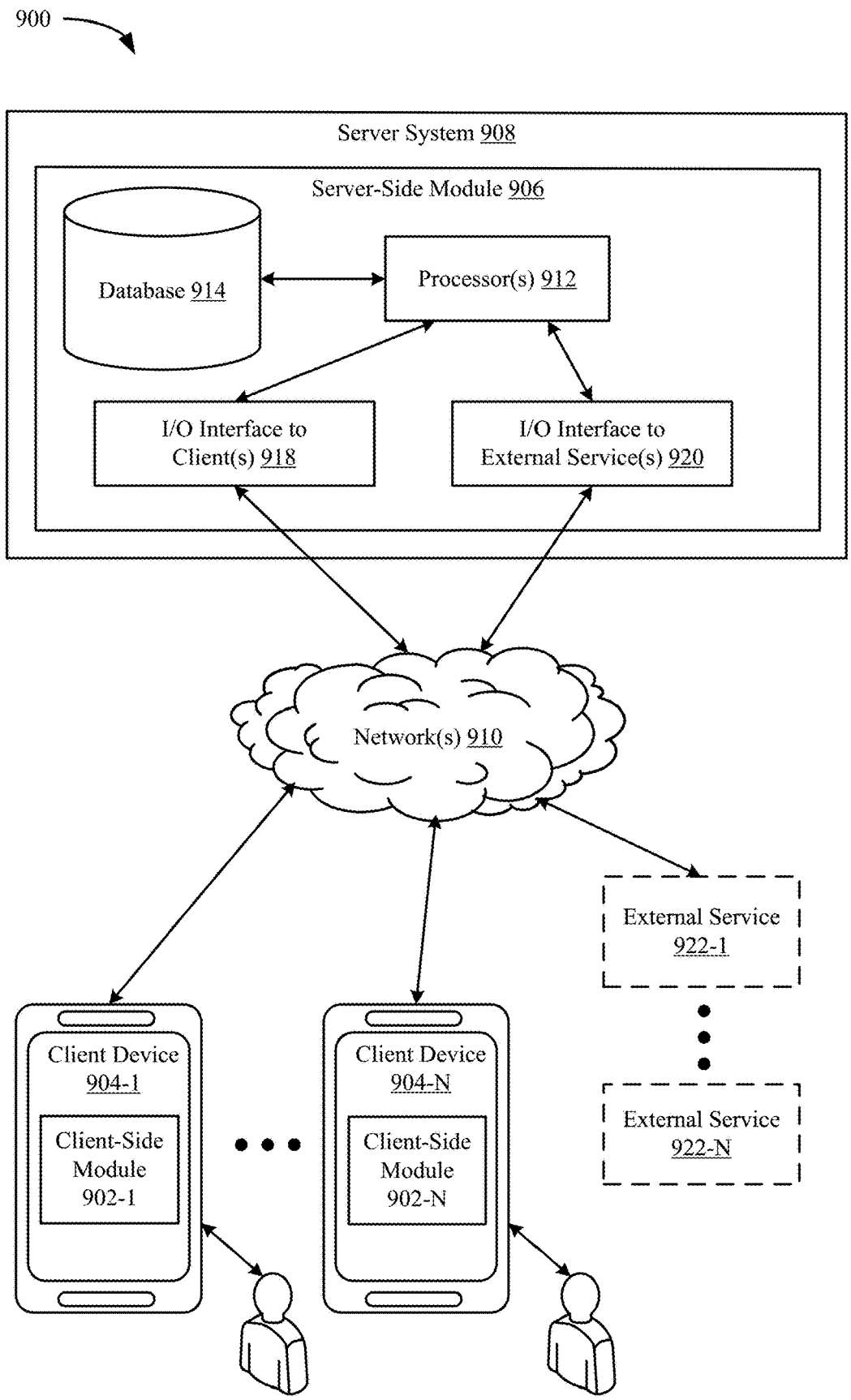
FIG. 9 is a block diagram of a server-client environment in accordance with some embodiments.

As shown in FIG. 9, processing payments is implemented in a server-client environment 900 in accordance with some embodiments. In some embodiments, server-client environment 900 includes client-side processing 902-1 . . . 902-N (hereinafter "client-side module 902") executed on a client device 904-1 . . . 904-N, and server-side processing 906 (hereinafter "server-side module 906") executed on a server system 908. Client-side module 902 communicates with server-side module 906 through one or more networks 910. Client-side module 902 provides client-side functionalities for the social networking platform (e.g., instant messaging, and social networking services) and communications with server-side module 906. Server-side module 906 provides server-side functionalities for the social networking platform (e.g., instant messaging, and social networking services) for any number of client modules 902 each residing on a respective client device 904.

In some embodiments, server-side module 906 includes one or more processors 912, one or more databases 914, an I/O interface to one or more clients 918, and an I/O interface to one or more external services 920. I/O interface to one or more clients 918 facilitates the processing of input and output associated with the client devices for server-side module 906. One or more processors 912 obtain instant messages from a plurality of users, process the instant messages, process location information of a client device, and share location information of the client device to client-side modules 902 of one or more client devices. The database 914 stores various information, including but not limited to, map information, service categories, service provider names, and the corresponding locations. The database 914 may also store a plurality of user accounts, account settings and account records. I/O interface to one or more external services 920 facilitates communications with one or more external services 922 (e.g., merchant websites, credit card companies, and/or other processing services).

Examples of client device 904 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 910 include local area networks (LAN) and wide area networks (WAN) such as the Internet. One or more networks 910 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 908 is implemented on one or more standalone data processing apparatuses or a distributed network of computers. In some embodiments, server system 908 also employs various virtual devices and/or services of third party service providers (e.g., third-party cloud service providers) to provide the underlying computing resources and/or infrastructure resources of server system 908.

Server-client environment 900 shown in FIG. 9 includes both a client-side portion (e.g., client-side module 902) and a server-side portion (e.g., server-side module 906). In some embodiments, data processing is implemented as a standalone application installed on client device 904. In addition, the division of functionalities between the client and server portions of client environment data processing can vary in different embodiments. For example, in some embodiments, client-side module 902 is a thin-client that provides only user-facing input and output processing functions, and delegates all other data processing functionalities to a backend server (e.g., server system 908).

Figure 10:
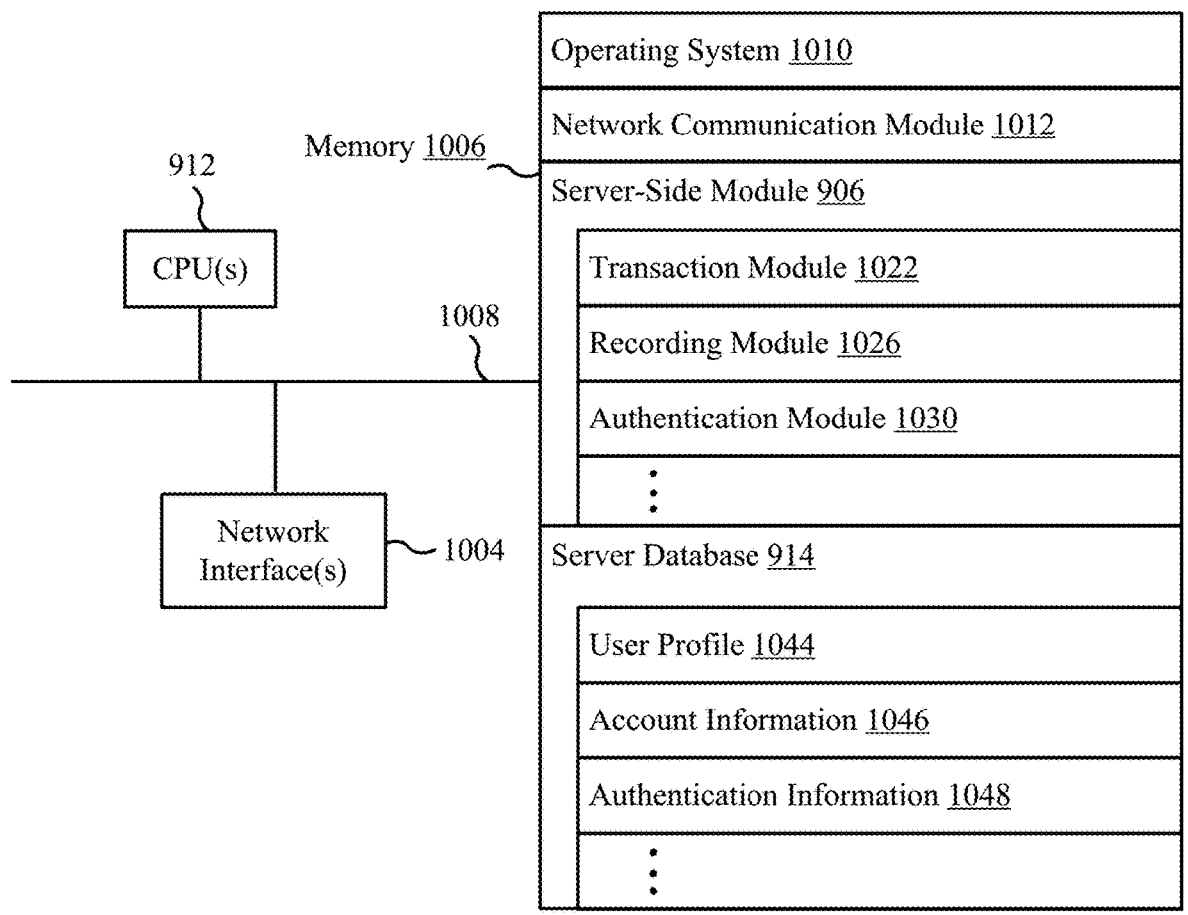
FIG. 10 is a block diagram of a server system in accordance with some embodiments.

FIG. 10 is a block diagram illustrating a server system 908 in accordance with some embodiments. Server system 908, typically, includes one or more processing units (CPUs) 912, one or more network interfaces 1004 (e.g., including I/O interface to one or more clients 918 and I/O interface to one or more external services 920), memory 1006, and one or more communication buses 1008 for interconnecting these components (sometimes called a chipset).

Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 912. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

operating system 1010 including procedures for handling various basic system services and for performing hardware dependent tasks;

network communication module 1012 for connecting server system 908 to other computing devices (e.g., client devices 904 and external service(s) 922) connected to one or more networks 910 via one or more network interfaces 1004 (wired or wireless);

server-side module 906, which provides server-side data processing for the pre-set payment platform (e.g., money transfer, authentication, and accounting services), includes, but is not limited to:

transaction module 1022 for obtaining transaction details from purchase applications and payment applications of client devices 904, including descriptions of goods and services, name and identifiers of payees, messages associated with payments;

recording module 1026 for storing various information in the database 914, the various information including past transaction information, user settings, registered user devices, account balances, account identifiers, and so on;

authentication module 1030 for receiving authentication information from user devices and authenticate and approve payments; and one or more server database 914 storing data for the payment platform, including but not limited to:

user profile 1044 storing user settings, user registration data, user login history, user contact information, user social network accounts, and so on;

account information 1046 storing account balances, transaction history, linked credit card information, app credit or gift card balance, billing address, shipping address; and authentication information 1048 storing authentication information that is used to authenticate the validity of payment requests, including, e.g., user name, password, security questions and answers, PIN, registered user device identifiers.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Figure 11:
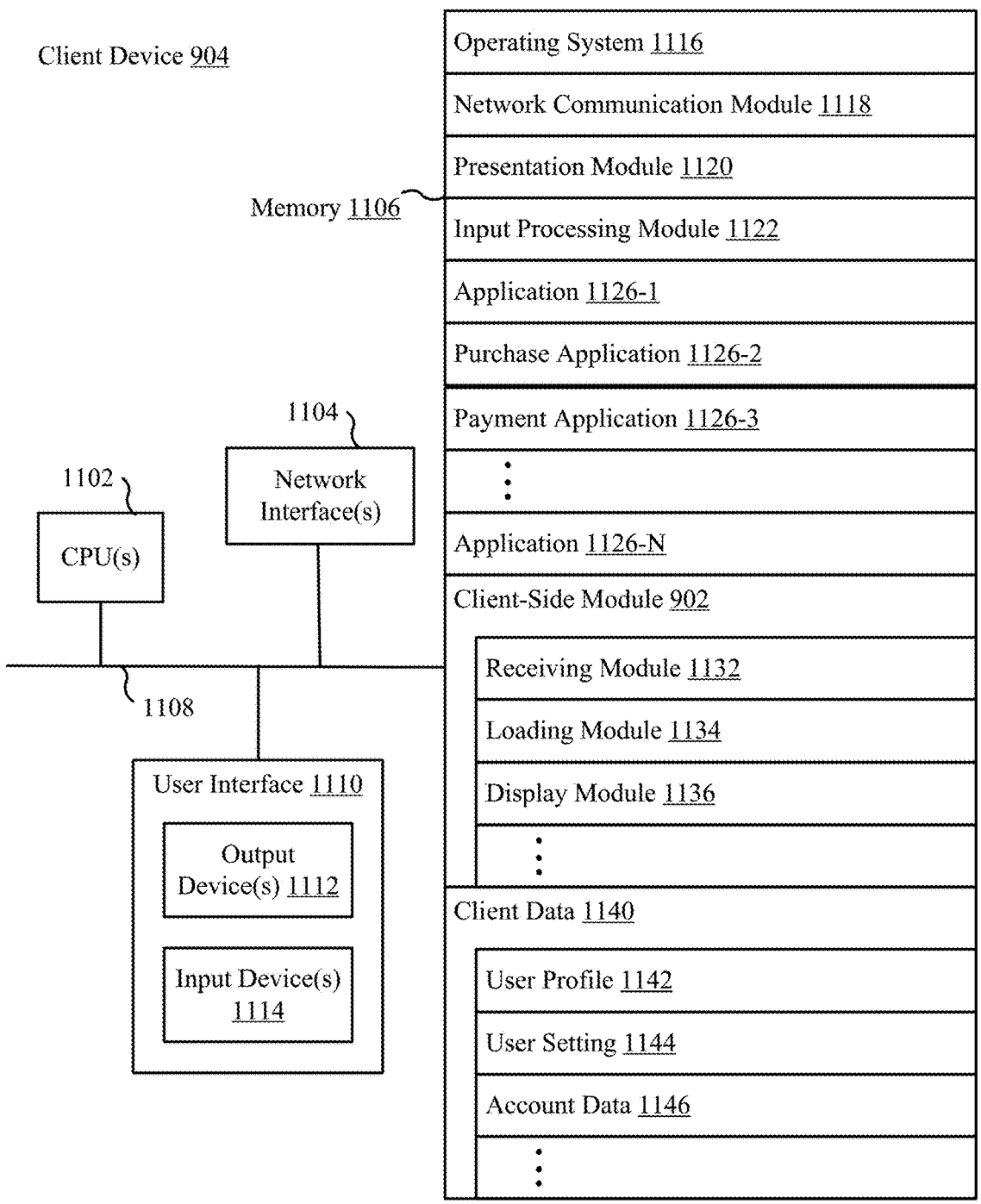
FIG. 11 is a block diagram of a client device in accordance with some embodiments.

FIG. 11 is a block diagram illustrating a representative client device 904 in accordance with some embodiments. Client device 904, typically, includes one or more processing units (CPUs) 1102, one or more network interfaces 1104, memory 1106, and one or more communication buses 1108 for interconnecting these components (sometimes called a chipset). Client device 904 also includes a user interface 1110. User interface device 1110 includes one or more output devices 1112 that enable presentation of media content, including one or more speakers and/or one or more visual displays. User interface device 1110 also includes one or more input devices 1114, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 904 use a microphone and voice recognition or a camera and gesture recognition to supplement or replace the keyboard.

Memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1106, optionally, includes one or more storage devices remotely located from one or more processing units 1102. Memory 1106, or alternatively the non-volatile memory within memory 1106, includes a non-transitory computer readable storage medium. In some implementations, memory 1106, or the non-transitory computer readable storage medium of memory 1106, stores the following programs, modules, and data structures, or a subset or superset thereof:

operating system 1116 including procedures for handling various basic system services and for performing hardware dependent tasks;

network communication module 1118 for connecting client device 904 to other computing devices (e.g., server system 908 and external service(s) 922) connected to one or more networks 910 via one or more network interfaces 1104 (wired or wireless);

presentation module 1120 for enabling presentation of information (e.g., a payment interface, an entry interface, widget, webpage, game, and/or application, audio and/or video content, text, etc.) at client device 904 via one or more output devices 1112 (e.g., displays, speakers, etc.) associated with user interface 1110;

input processing module 1122 for detecting one or more user inputs or interactions from one of the one or more input devices 1114 and interpreting the detected input or interaction;

one or more applications 1126-1-1126-N for execution by client device 904 (e.g., games, application marketplaces, payment platforms, payment platforms, and/or other applications), including at least a purchase application 1126-2 and a payment application 1126-3; and client-side module 902, which provides client-side data processing and functionalities for processing payments, including but not limited to:

receiving module 1132 for receiving user inputs and instructions with regard to processing payments;

loading module 1134 for selecting loading process and loading applications in accordance with the selection; and display module system 1136 for presenting payment interfaces of purchase applications and payment applications in accordance with the selected loading process and progress of payments; and client data 1140 storing data of a user associated with the client device, including, but is not limited to:

user profile 1142 storing a user profile associated with the user of client device 904 including a user/account name or handle, login credentials for processing payments, social network contacts, groups of contacts to which the user belongs, and identified trends and/or likes/dislikes of the user;

user setting 1144 storing settings with regard to online shopping and payments, including criteria of selecting loading processes; and account data 1146 storing accounts bound with the user device, payment data (e.g., linked credit card information, app credit or gift card balance, billing address, shipping address, etc.), authentication information (e.g., saved user name), and so on.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

In some embodiments, at least some of the functions of server system 908 are performed by client device 904, and the corresponding sub-modules of these functions may be located within client device 904 rather than server system 908. In some embodiments, at least some of the functions of client device 904 are performed by server system 908, and the corresponding sub-modules of these functions may be located within server system 908 rather than client device 904. Client device 904 and server system 908 shown in FIGS. 10-3, respectively, are merely illustrative, and different configurations of the modules for implementing the functions described herein are possible in various embodiments.

While particular embodiments are described above, it will be understood it is not intended to limit the technology to these particular embodiments. On the contrary, the technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of processing a payment through invoking a payment application from a purchase application, the method comprising:
   at a mobile terminal having one or more processors and memory for storing one or more programs to be executed by the one or more processors, wherein the mobile terminal is pre-installed with the purchase application and the payment application that corresponds to a pre-set payment platform, and the purchase application and the payment application are two distinct application running on the mobile terminal:
      executing the purchase application in a foreground process;
      receiving, on an entry interface of the purchase application, a user instruction for starting a payment through the pre-set payment platform that offers a payment option associated with the payment application;
      determining a security type of connection through which the mobile terminal is currently connected to the Internet;
      in accordance with a determination that the security type of the connection indicates that the mobile terminal is connected to the Internet via a password-protected private network:
         presenting a payment interface of the purchase application at the mobile terminal in response to the user instruction;
         generating, on the payment interface of the purchase application, one or more payment interface elements that are similar to a look and feel design of the payment application without loading the payment application into the foreground process;
         collecting transaction information associated with the payment application from the payment interface of the purchase application; and
         completing the payment using the transaction information collected from the payment interface of the payment application.

2. The method of claim 1, collecting the transaction information further comprising:
   receiving a first user input for the payment through the payment interface, the first user input including the transaction information associated with the payment application; and
   sending a payment request including at least the transaction information received from the first user input for the payment to the pre-set payment platform.

3. The method of claim 2, wherein the payment interface is generated by the purchase application to simulate a corresponding payment interface of the payment application having the look and feel design.

4. The method of claim 3, further comprising:
   acquiring an account identifier from the payment platform; and
   displaying the account identifier in the payment interface generated by the purchase application.

5. The method of claim 1, further comprising
   receiving a second user input for the payment through the payment interface generated by the purchase application; and
   in accordance with the second user input for the payment, determining whether to invoke the payment application.

6. The method of claim 5, further comprising:
   in accordance with a determination to invoke the payment application, obtaining a progress state of the payment;
   selecting a respective user interface corresponding to the progress state of the payment as a current payment interface of the payment application; and
   displaying the current payment interface of the payment application in place of the payment interface generated by the purchase application.

7. The method of claim 1, further comprising:
   determining that pre-set authentication is required;
   displaying an authentication interface; and receiving a third user input of pre-set authentication information, wherein the third user input is sent to the pre-set payment platform.

8. A mobile terminal used for processing a payment through invoking a payment application from a purchase application, wherein the mobile terminal is pre-installed with the purchase application and the payment application that corresponds to a pre-set payment platform, and the purchase application and the payment application are two distinct application running on the mobile terminal, the mobile terminal further comprising:

one or more processors;
memory coupled to the one or more processors; and
one or more programs stored therein, wherein the one or more programs, when executed by the one or more processors, cause the mobile terminal to perform instructions for:
  executing the purchase application in a foreground process;
  receiving, on an entry interface of the purchase application, a user instruction for starting a payment through the pre-set payment platform that offers a payment option associated with the payment application;
  determining a security type of connection through which the mobile terminal is currently connected to the Internet;
  in accordance with a determination that the security type of the connection indicates that the mobile terminal is connected to the Internet via a password-protected private network:
    presenting a payment interface of the purchase application at the mobile terminal in response to the user instruction;
    generating, on the payment interface of the purchase application, one or more payment interface elements that are similar to a look and feel design of the payment application without loading the payment application into the foreground process:
    collecting transaction information associated with the payment application from the payment interface of the purchase application; and
    completing the payment using the transaction information collected from the payment interface of the payment application.

9. The mobile terminal of claim 8, wherein the instructions for collecting the transaction information further comprise instructions for:
  receiving a first user input for the payment through the payment interface, the first user input including the transaction information associated with the payment application; and
  sending a payment request including at least the transaction information received from the first user input for the payment to the pre-set payment platform.

10. The mobile terminal of claim 9, wherein the payment interface is generated by the purchase application to simulate a corresponding payment interface of the payment application having the look and feel design.

11. The mobile terminal of claim 10, wherein the instructions further comprise:
  acquiring an account identifier from the payment platform; and
  displaying the account identifier in the payment interface generated by the purchase application.

12. The mobile terminal of claim 8, wherein the one or more programs further comprises instructions for:

receiving a second user input for the payment through the payment interface generated by the purchase application; and
  in accordance with the second user input for the payment, determining whether to invoke the payment application.

13. The mobile terminal of claim 12, wherein the one or more programs further comprise instructions for:
  in accordance with a determination to invoke the payment application, obtaining a progress state of the payment;
  selecting a respective user interface corresponding to the progress state of the payment as a current payment interface of the payment application; and
  displaying the current payment interface of the payment application in place of the payment interface generated by the purchase application.

14. The mobile terminal of claim 8, wherein the one or more programs further comprise instructions for:
  determining that pre-set authentication is required;
  displaying an authentication interface; and
  receiving a third user input of pre-set authentication information, wherein the third user input is sent to the pre-set payment platform.

15. A non-transitory computer readable storage medium having instructions stored thereon for processing a payment through invoking a payment application from a purchase application that are pre-installed in a mobile terminal, wherein the mobile terminal is pre-installed with the purchase application and the payment application that corresponds to a pre-set payment platform, and the purchase application and the payment application are two distinct application running on the mobile terminal, and the instructions, when executed by the mobile terminal, cause the mobile terminal to perform operations comprising:
  executing the purchase application in a foreground process;
  receiving, on an entry interface of the purchase application, a user instruction for starting a payment through the pre-set payment platform that offers a payment option associated with the payment application;
  determining a security type of connection through which the mobile terminal is currently connected to the Internet;
  in accordance with a determination that the security type of the connection indicates that the mobile terminal is connected to the Internet via a password-protected private network:
    presenting a payment interface of the purchase application at the mobile terminal in response to the user instruction;
    generating, on the payment interface of the purchase application, one or more payment interface elements that are similar to a look and feel design of the payment application without loading the payment application into the foreground process;
    collecting transaction information associated with the payment application from the payment interface of the purchase application; and
    completing the payment using the transaction information collected from the payment interface of the payment application.

16. The non-transitory computer readable storage medium of claim 15, wherein the instructions for collecting the transaction information further comprise instructions for:
  receiving a first user input for the payment through the payment interface; and sending a payment request including at least information from the first user input for the payment to the pre-set payment platform receiving a first user input for the payment through the payment interface, the first user input including the transaction information associated with the payment application; and sending a payment request including at least the transaction information received from the first user input for the payment to the pre-set payment platform.

17. The non-transitory computer readable storage medium of claim 16, wherein the payment interface is generated by the purchase application to simulate a corresponding payment interface of the payment application having the look and feel design.

18. The non-transitory computer readable storage medium of claim 17, wherein the instructions further comprise:

acquiring an account identifier from the payment platform; and displaying the account identifier in the payment interface generated by the purchase application.

19. The non-transitory computer readable storage medium of claim 15, further comprising instructions for:

receiving a second user input for the payment through the payment interface generated by the purchase application; and in accordance with the second user input for the payment, determining whether to invoke the payment application.

20. The method of claim 1, further comprising, in accordance with a determination that the security type of the connection indicates that the mobile terminal is connected to the Internet via a public network:

loading the payment application in the foreground process;

collecting the transaction information in the payment application using increased encryption capabilities of the payment application; and completing the payment using the transaction information collected from the payment application.

* * * * *